(12) United States Patent
Davis-Hall

(10) Patent No.: US 6,601,066 B1
(45) Date of Patent: Jul. 29, 2003

(54) METHOD AND SYSTEM FOR VERIFYING HYPERLINKS

(75) Inventor: Michael Davis-Hall, Pittsfield, MA (US)

(73) Assignee: General Electric Company, Pittsfield, MA (US)

(*) Notice: Subject to any disclaimer, the term of this patent is extended or adjusted under 35 U.S.C. 154(b) by 0 days.

(21) Appl. No.: 09/465,915

(22) Filed: Dec. 17, 1999

(51) Int. Cl.[7] .................................. G06F 17/30
(52) U.S. Cl. .................................. 707/5; 707/10
(58) Field of Search .................................. 707/1–6, 10

(56) References Cited

U.S. PATENT DOCUMENTS

| | | | |
|---|---|---|---|
| 5,144,555 A | 9/1992 | Takadachi et al. | 364/419 |
| 5,159,669 A | 10/1992 | Trigg et al. | 395/169 |
| 5,355,472 A | 10/1994 | Lewis | 395/600 |
| 5,430,876 A | 7/1995 | Schreiber et al. | 395/650 |
| 5,564,046 A | 10/1996 | Nemoto et al. | 395/600 |
| 5,787,281 A | 7/1998 | Schreiber et al. | 395/684 |
| 5,805,824 A | 9/1998 | Kappe | 395/200.72 |
| 5,870,559 A | 2/1999 | Leshem et al. | 395/200.54 |
| 5,898,836 A | 4/1999 | Freivald et al. | 395/200.48 |
| 5,918,214 A | 6/1999 | Perkowski | 705/27 |
| 5,941,944 A | 8/1999 | Messerly | 709/203 |
| 5,958,008 A | 9/1999 | Pogrebisky et al. | 709/223 |
| 5,978,842 A | 11/1999 | Noble et al. | 709/218 |
| 5,983,268 A | 11/1999 | Freivald et al. | 709/218 |
| 6,006,225 A | 12/1999 | Bowman et al. | 707/5 |
| 6,012,087 A | 1/2000 | Freivald et al. | 709/218 |
| 6,144,962 A | * 11/2000 | Weinberg et al. | 707/10 |
| 6,163,778 A | * 12/2000 | Fogg et al. | 707/10 |
| 6,219,818 B1 | 4/2001 | Freivald et al. | 714/799 |
| 6,260,039 B1 | * 7/2001 | Schneck et al. | 707/10 |
| 6,321,242 B1 | * 11/2001 | Fogg et al. | 707/513 |

* cited by examiner

Primary Examiner—James P. Trammell
Assistant Examiner—Mary Wang

(57) ABSTRACT

An exemplary embodiment of the invention is a method for verifying hyperlinks on a web site. The method includes generating a hyperlink database including a plurality of hyperlinks and a uniform resource locator associated with each hyperlink. An Internet browser application is initiated and the Internet browser application attempts to retrieve content in response to the uniform resource locator. A presence or absence of an error is detected in retrieving the content. A web site administrator is notified of the results.

14 Claims, 4 Drawing Sheets

FIG. 3

| NAME | LINK URL: | LINK LOCATION | EXPECTED CONTENT | RETURNED CONTENT | STATUS |
|---|---|---|---|---|---|
| Student Finance | http://www.someplace.com | C:/Webpages/Page1 | <head><meta http-equiv="Content-Type" content="text/html; charset=iso-8859-1"><title>Student Finance</title> | <head><meta http-equiv="Content-Type" content="text/html; charset=iso-8859-1"><title>Student Finance</title> | Confirmed |
| Information | http://www.someplace.com/index | C:/Webpages/Page1 | <head><meta http-equiv="Content-Type" content="text/html; charset=iso-8859-1"><title>Information</title> | <head><meta http-equiv="Main Page" content="text/html; charset=iso-2341-5"><title>Welcome to Books on Tape</title> | Error |
| Graduation | http://www.someotherplace.com | C:/Webpages/Page100 | <head><meta http-equiv="Content-Type" content="text/html; charset=iso-8859-1"><title>Graduation</title> | Error 404 | Error |

200   202   204   206   207   208

METHOD AND SYSTEM FOR VERIFYING HYPERLINKS

BACKGROUND OF THE INVENTION

Internet usage has increased dramatically in the past few years and, as a result, the usage of hypertext documents that contain hyperlinks has also increased dramatically. Hyperlinks provide an address path to access content that is related to or associated with text, graphics, video, audio, etc. Typically, a user utilizes a hyperlink by selecting the hyperlink with a mouse. Specifically, the user positions a mouse cursor over the hyperlink (which is underlined, highlighted, displayed in a different color or otherwise distinguished in a manner that indicates that it is a hyperlink) and clicks the mouse to retrieve content accessible through the hyperlink. Upon the user selection of the hyperlink, a web browser program accesses the address path of the content that is referenced by the hyperlink. The address path of the content is usually represented by a uniform resource locator, or URL. The browser retrieves the content located at the location indicated by the URL, and renders the content to the user. For most web pages, this entails displaying video information on a video display for a web page. Audio information may also be retrieved and output. Hyperlinks may also initiate a transfer of content to the user's computer through file transport protocol (i.e., FTP) or other sites.

FIG. 1 is a block diagram that illustrates the basic scheme that is employed in retrieving such content with a conventional web browser 110. The web browser 110 is run on a client computer system 112. The web browser 110 is used to generate a request 114 for the content from a server computer system 116. Typically, this request 114 is a GET request that complies with the hypertext transfer protocol (HTTP). It is understood that server 116 may provide the content or server 116 may access one or more additional servers to retrieve the content. For example, server 116 may be a local server which a user contacts to access the Internet. A second server may then be accessed to provide the content.

The server computer 116 receives the request 114, accesses the content 118 stored therein, and returns a copy of the content 120 to the client computer system 112. The content may be a new web page or may be a file obtained through an FTP process, or a similar process. The web browser 110 includes code for rendering the content 120 so that the content is output to the user. Typically, for a web page, the copy of the content 120 is forwarded as a hypertext markup language (HTML) content. The HTML content may contain a number of hyperlinks that enable the user to gain access to other web sites.

Throughout the following discussion, for the purpose of clarity, conventional hypertext terminology will be used with respect to hyperlinks and the content they refer to, as opposed to the more general object terms of resources and references. However, as would be understood by those of skill in the art, the method of the present invention will work for any relationship between any objects.

Hypertext systems are normally window-based, and newly displayed content, in the form of documents for instance, generally appear in windows on the user's display. The new content will often contain more hyperlinks to other content. By following hyperlinks, the user is said to "navigate." Hyperlinks present a powerful means to navigate within entire networks, and Internet navigation through the use of hyperlinks embedded within hypertext content is a well-established technology. While viewing hypertext content, the user can exercise a great deal of control over the order in which information is presented as well as play a very active role in selecting how far to pursue a given topic. Hyperlinks found within a web site can link to other content within that web site or to content located at remote sites.

A web site, which can have many hundreds of web pages linked together and to outside content with hyperlinks, is typically organized and maintained by an administrator. A web site administrator is often called a "webmaster." Webmasters are responsible for, among other things, the accuracy of the hyperlinks embedded in the content on their web sites.

Problems arise in web site administration when hyperlinks fail to connect web site users to the expected target content. One difficulty encountered with hypertext content is that the hyperlinks embedded within the content may be unresolvable (i.e., not resolved to a web site). This typically results in the user receiving an "Error 404" or similar message. This message can appear on a user's screen when the user clicks on a hyperlink that fails to direct the user to content, but in any case the user's browser is notified of the error. In other words, the hyperlink directs the user to a URL that does exist, and is therefor unresolvable or "broken." Causes for such unresolvable hyperlinks include incorrectly configured hyperlinks (e.g., containing a typographical error), or, much more commonly, a change or deletion of the storage location of the content without a concurrent update of the hyperlinks contained within the referring page. In such cases, the web browser of the user returns an error message because content is no longer located at the address path (URL) specified by the hyperlink. As a result, the user is unable to access the content referenced by the hyperlink.

Similar difficulties may be encountered in different environments. Other references to objects or files may also be subject to changes that makes them unresolvable. For example, hyperlinks and path names that refer to other files or objects may change. These references may also be, for example, object identifiers (object IDs) or other types of signatures that uniquely identify a file or object holding text or other media, such as audio data or video data. Unfortunately, such an object identifier, path name, or resource identifier may not be current. As a result, access to the resource may not be possible. Other errors may be returned to the user when a web site server is temporarily inoperable or overloaded. If web site users frequently click on hyperlinks that return error codes, then the web site will likely engender anxiety among its users, and could lead to disuse of the web page by the user. In any of the above cases, the hyperlink that returns an error when activated is considered to be a "broken" link.

A related problem arises when a user clicks on a hyperlink which is, in fact, active, but which does not provide the expected content because the hyperlink has been reassigned to a new owner or the owner has substantially revised the content. A second related problem is when a link points to a site that has "moved" to a new URL, forcing the user to click one or more additional times to gain the desired access. In addition, instead of an error message, a server may provide content stating that the page could not be found and recommend actions to the user. None of these scenarios generates an error message, but all frustrate the user by providing content that is not desired by the user and/or delaying access to the desired content.

Currently, a webmaster verifies hyperlinks by either manually checking each hyperlink or being notified of broken hyperlinks through user reported errors. Manually checking for broken hyperlinks is time consuming and subject to human error. Relying on user reported errors will not result in effective hyperlink verification due to low user reporting rates. What is needed in the art is a method or system with which a webmaster can verify with ease and confidence that the content referenced by the web site's hyperlinks are retrievable. That is, a method or system for verifying that a hyperlink will not cause an error code to be returned to the user. Additionally, since webmasters will frequently not want the referenced content of their web site's hyperlinks to be altered even if the link is an active (not broken) link, a method for verifying that active links refer to content that is consistent with the webmaster's and the users' expectations and is needed in the art.

BRIEF SUMMARY OF THE INVENTION

An exemplary embodiment of the invention is a method for verifying hyperlinks on a web site. The method includes generating a hyperlink database including a plurality of hyperlinks and a uniform resource locator associated with each hyperlink. An Internet browser application is initiated and the Internet browser application attempts to retrieve content in response to the uniform resource locator. A presence or absence of an error is detected in retrieving the content. A web site administrator is notified of the results and errors are reported.

BRIEF DESCRIPTION OF THE DRAWINGS

FIG. 3 is a table that represents one embodiment of a hyperlink database that is used in the present invention;

DETAILED DESCRIPTION OF THE INVENTION

An exemplary embodiment of the invention is a method and system for detecting and reporting hyperlinks that return error codes referred to as broken hyperlinks, and/or hyperlinks that hyperlink to unexpected or changed content. An embodiment of the invention scans web sites and generate a list of broken or altered hyperlinks for the web site. The webmaster can then change the hyperlinks as needed.

Figure 1:
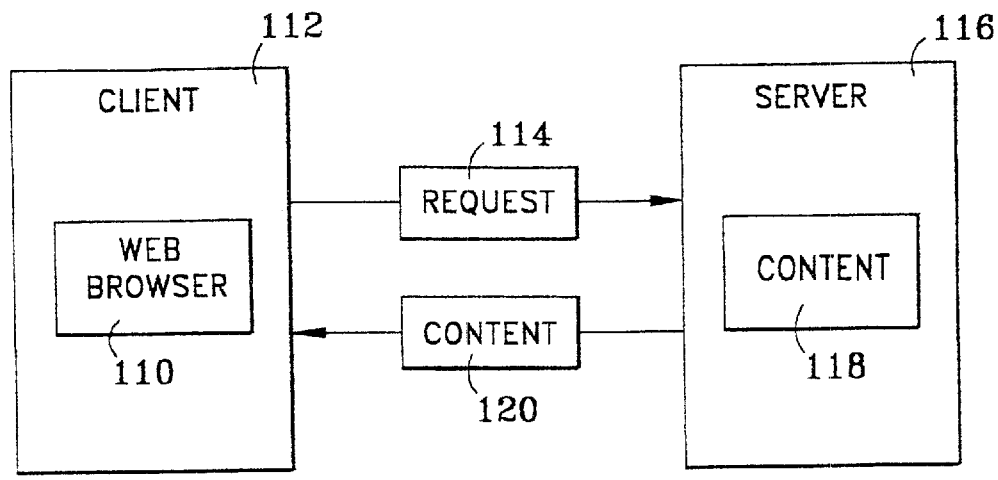
FIG. 1 is a block diagram of a conventional system that is used to access content on the Internet.
Figure 2:
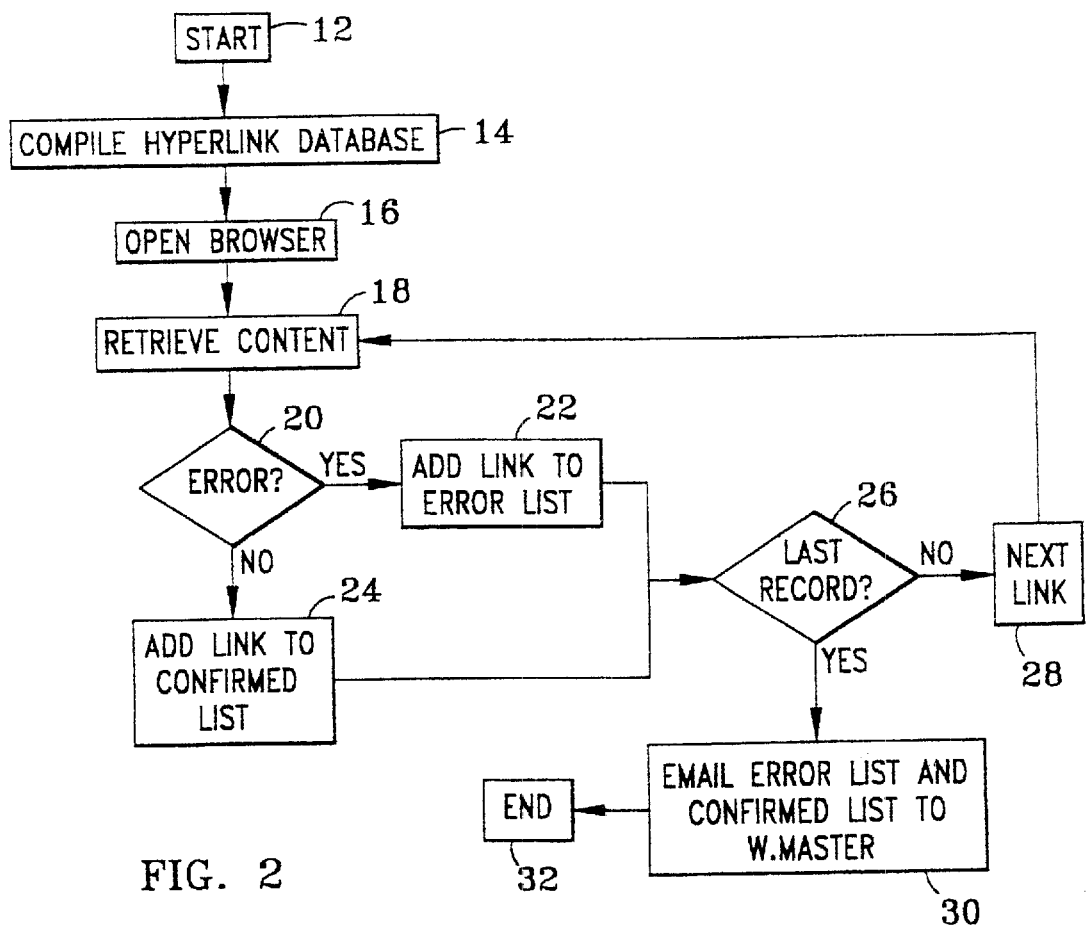
FIG. 2 is a flow chart of the operation of one embodiment of the present invention, specifically, one in which a hyperlink database is compiled.

FIG. 2 shows an exemplary hyperlink verification process which may be implemented by a server 116 or a client 112. The process may be implemented through a computer program which is executed by the client 112 or the server 116 to perform the process shown in FIG. 2. The process is initiated by a start command as shown at step 12. The start command can be generated automatically (every 24 hours, for instance) or manually by the webmaster. In either case, a hyperlink database (see FIG. 3 and discussion below) is accessed. A hyperlink database can be maintained as a routine web site feature through manual addition and removal of hyperlinks from the database as hyperlinks are added and deleted from the web site. For example, each addition or deletion of a hyperlink to or from a web page (e.g., using HTML) can be detected by monitoring the HTML code. Any time a hyperlink is added or deleted, the hyperlink can be provided to the webmaster (e.g., through e-mail) and the webmaster may be given authority to approve or deny addition or deletion of the hyperlink. Additionally, a hyperlink database can be compiled automatically, as is shown in FIG. 2 at step 14. The automatic hyperlink database compilation entails searching the entire web site for embedded hyperlinks. This searching can be done at the HTML level, for instance, and simply requires the identification and compiling of URL identifiers coded for in the web site. As discussed below with reference to FIG. 3, the hyperlink database may or may not contain information regarding the content expected to be associated with each URL.

Once the hyperlink database has been compiled in step 14, an Internet browser program is opened at 16. After the browser is opened, the first hyperlink and the URL associated with the first hyperlink listed in the hyperlink database is input into the browser, and the content associated with the URL is requested in step 18. Through conventional techniques, the specified content is returned, or an error message is returned. In step 20, the system checks for an error code. This code can be a "404 URL unknown" error, or any other error that prevents the return of content associated with the hyperlink and its corresponding URL. If an error code is returned, then the hyperlink and its associated information (see FIG. 3) are, in step 22, be added to an error list, which may be a text document identifying hyperlinks for which an error was detected. If, on the other hand, no error code is returned (that is, the browser successfully retrieves the content), then the hyperlink and its associated information are, in step 24, added to a confirmed list, which, like the error list, may be a text document.

After checking for an error and entering the hyperlink and its associated information into either the error list or the confirmed list, flow proceeds to step 26 where it is determined if the previous hyperlink record was the final record in the hyperlink database. If the previous hyperlink record was not the last hyperlink record in the hyperlink database, then, in step 28, the process moves to the next hyperlink record in the hyperlink database. Flow returns to step 18, and iteration continues until the last record is indicated in step 26. When the last record is indicated in step 26, flow proceeds to step 30, where notification of the webmaster takes place. In step 30, the error list generated by step 22 can be added to an email, for instance. The confirmed list generated in step 24 can also be incorporated into the email, but this is not always necessary. The main advantage gained by inserting the confirmed list in the email in step 30 is the confirmation that all hyperlinks have been checked and are correctly functioning hyperlinks. Without such notification, the functioning status of hyperlinks not added to the error list in step 22 can only be assumed.

Although email is a preferred notification method in step 30, virtually any means of notification can be used, including, but not limited to, printed lists, stored files, and faxes. In step 32, the process concludes operation, and this final step can include closing the browser and the hyperlink database files.

FIG. 3 is an illustrative hyperlink database as described above. A NAME field 200 represents the hyperlink's display characteristics. That is, the NAME field 200 stores the hyperlink name as it is seen by the user. These names are typically shown as differentially colored, underlined or otherwise distinguishable text within the body of an HTML content, but they may also be displayed to the user as an image. The NAME field 200 information can be included in the email to the webmaster in step 30 of FIG. 2.

The LINK URL field 202 stores the URL that is associated with the hyperlink. In FIG. 3, the hyperlink URLs are shown as conventional World Wide Web URLs, but any other referential linking system could be used as well (such as Gopher or FTP). As described above, the content to be retrieved may be a file provided by an FTP site or any other type of content. The hyperlink URLs are used by the browser in step 18 to request the content associated with the hyperlink.

The LINK LOCATION field 204 stores information about the memory location of the hyperlink on the webmaster's system. The hyperlink LINK LOCATION information can be sent to the webmaster in step 30. The hyperlink LINK LOCATION information will allow the webmaster to quickly locate broken hyperlinks within the web site. When a broken hyperlink has been added to the error list in step 22, for instance, the system can email the webmaster with the LINK LOCATION, which will indicate the web site's hard drive storage location of the particular HTML content in which the broken hyperlink is imbedded. This facilitates removal or editing of the broken hyperlink.

The EXPECTED CONTENT field 206 stores information from the HTML content to which the hyperlink refers. This field can be used to check for alterations in a URL's content. If the URL points to an FTP site, the EXPECTED CONTENT field 206 may include the size of the file to be downloaded. A RETURNED CONTENT field 207 contains the content returned in step 18 upon accessing the URL in LINK URL field 202. As described below with reference to FIGS. 4 and 5, discrepancies between the EXPECTED CONTENT field 206 and the RETURNED CONTENT field 207 may be used to determine an error. In other words, if the content to which a hyperlink refers is changed, the EXPECTED CONTENT field 206 information will not match the RETURNED CONTENT field 207 returned by the browser in step 18. Processing content for changes is described in more detail herein with reference to FIG. 4. The STATUS field 208 indicates whether or not a hyperlink has been confirmed or has generated an error. This field can be used to parse hyperlinks for those that have produced an error. Also, in embodiments discussed below, this field can be used to store information about the frequency of errors or time elapsed since the last error.

Figure 4:
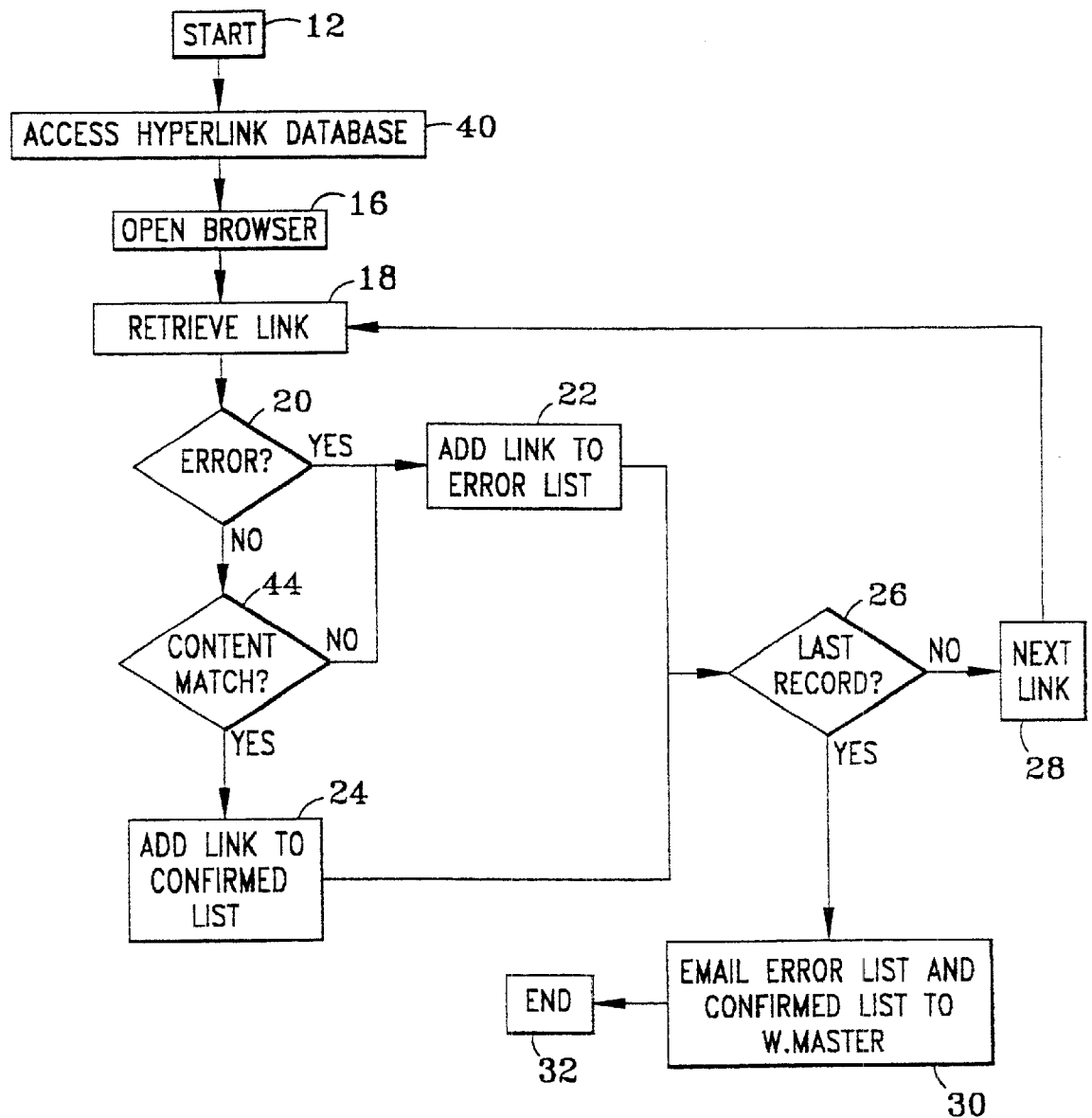
FIG. 4 is a flow chart of the operation of one embodiment of the present invention, specifically, one in which content referred to by active hyperlinks is verified; and, FIG. 5 is a flow chart of the operation of one embodiment of the present invention, specifically one in which set parameters are checked for each hyperlink that has produced an error.

Another embodiment of the invention is shown in FIG. 4. FIG. 4 is a flowchart of a process for verifying hyperlinks in which changes in the content referenced by a hyperlink are detected. The process may be implemented through a computer program which is executed by the server 116 to perform the process shown in FIG. 4. Steps similar to those in FIG. 2 are labeled with similar reference numerals. In this embodiment, it is assumed that a hyperlink database such as that shown in FIG. 3 has already been established as described above. During database compilation, content from the URL referred to by the hyperlink is stored in the EXPECTED CONTENT field 206 of FIG. 3. When the process shown in FIG. 4 is started in step 12, the hyperlink database is accessed at step 40 to retrieve the first hyperlink to be verified.

Web site hyperlink verification proceeds as before through steps 16, 18, and 20. If no error is returned at 20, however, a content match is performed at step 44 to determine the amount of change in the content. Content from the RETURNED CONTENT field 207 compared directly to the EXPECTED CONTENT field 206 in the hyperlink database for the hyperlink in question. This step can be any matching technique known in the art, including, but not limited to, a percentage-based content matching. The webmaster can set the level at which a match is declared. If, for example, at least 80% of the content matches (or less than 20% of the content is changed), then the altered content will be considered a match. For FTP sites, the EXPECTED CONTENT field 206 may specify a file size which is compared to the size of the file retrieved. The size of the retrieved file is stored in the RETURNED CONTENT field 207. The system can operate either to update the EXPECTED CONTENT field 206 with the returned content, or to retain the original content in the EXPECTED CONTENT field 206.

If no match is declared in step 44, then the system proceeds to step 22 and adds the hyperlink and its associated data to the error list, and then continues to step 26 as described above with reference to FIG. 2. In this embodiment, the hyperlink verification system allows for the alteration of a target content to some previously defined extent. This system detects alterations in target content, and, if alterations are detected, the system can quantify the changes. If the alterations exceed a defined standard, the hyperlink will be added to the error list as shown in step 22. Entries in the error list may be assigned different codes depending on whether the error was due to a failure to retrieve any content (i.e., broken link) or due to a excessive change in content. Since target content will likely be updated or otherwise altered on a regular basis, it is often desirable to retain hyperlinks in the hyperlink database if alterations are only minor.

The hyperlink database may be updated at any time during system operation. As discussed above, the EXPECTED CONTENT field 206 may be updated automatically in step 24, or it may be manually updated by the webmaster after notification in step 30. The STATUS of a hyperlink can be updated in step 22 or step 24, or it can be entered manually.

Figure 5:
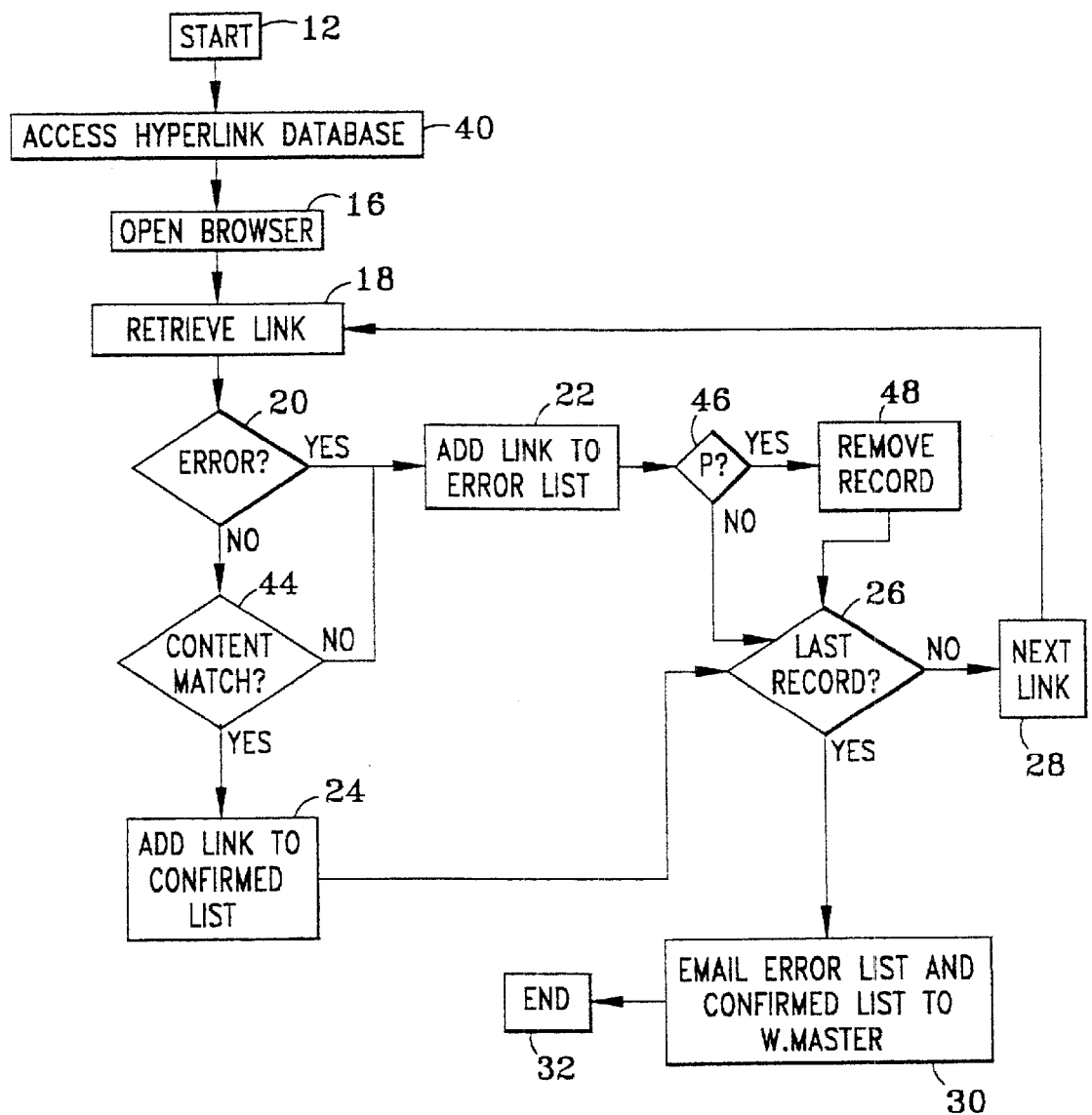

In another embodiment, shown in FIG. 5, hyperlinks can be automatically removed from the hyperlink database. The process may be implemented through a computer program which is executed by the server 116 to perform the process shown in FIG. 5. In this embodiment, after determination of an error in step 20 or a failed content match in 44, the STATUS field 208 of the hyperlink is checked against one or more defined parameters P in step 46. This parameter P can be the time elapsed since the last error was recorded in the STATUS field 208 or a more sophisticated parameter (e.g., errors per week). For instance, the parameter P could be the relative change in content of the retrieved content. If the content has been altered repeatedly, a cumulative alteration percentage may be derived and checked against the set parameter. For example, individual changes of 5% content may not cause an error in step 44 but a total change of 30% may be detected at step 46 resulting in removal of the hyperlink. Fields can be added as needed to the hyperlink database shown in FIG. 3 to enable comparison with parameter P. If the parameter is met, then the system proceeds to step 48 and removes the record from the hyperlink database. This system can notify the webmaster of the deletion at this step, and make any necessary changes to the web site that the deletion may require. If, in step 46, the parameter is not met, then the system proceeds as before and checks for last record status in step 26.

The parameter evaluation step 46 allows the web site to maintain hyperlinks that may refer to content that is temporarily inaccessible. If, for example, a hyperlink refers to content that is located on a server that is temporarily down, the parameter step can prevent premature deletion of the hyperlink record from the hyperlink database.

In any of the foregoing embodiments, one skilled in the art will recognize that, although world wide web conventions have been used, equivalents thereof apply equally as well to the system described.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method for verifying hyperlinks on a web site, the method comprising:
    generating a hyperlink database including a plurality of hyperlinks and a uniform resource locator associated with each hyperlink;
    said hyperlink database including expected content for at least one of said hyperlinks;
    initiating an internet browser application and attempting to retrieve content in response to said uniform resource locator;
    retrieving returned content; and,
    detecting a presence or absence of an error in retrieving said content, said error being determined based on a comparison of said expected content and said returned content;
    wherein said comparison of said expected contents and said returned content determines a percentage of matching content between said expected content and said returned content, said error being determined when said percentage of matching content is below a level.

2. The method of claim 1 further comprising:
    adding said hyperink to an error list upon detecting said presence of said error.

3. The method of claim 1 further comprising:
    adding said hyperlink to a confirmed list upon detecting said absence of said error.

4. The method of claim 3 further comprising:
    transmitting said confirmed list to a web site administrator.

5. The method of claim 1 further comprising:
    notifying a web site administrator of said error by transmitting said error list to said web site administrator.

6. The method of claim 1 wherein:
    said hyperlink database includes a link location field containing a storage location for each hyperlink.

7. The method of claim 1 wherein:
    said hyperlink database includes a status field indicating said presence or absence of said error with respect to each hyperlink.

8. A storage medium encoded with machine-readable computer program code for verifying hyperlinks on a web site, the storage medium including instructions for causing a computer to implement:
    generating a hyperlink database including a plurality of hyperlinks and a uniform resource locator associated with each hyperlink;
    said hyperlink database including expected content for at least one of said hyperlinks;
    initiating an internet browser application and attempting to retrieve content in response to said uniform resource locator;
    retrieving returned content; and,
    detecting a presence or absence of an error in retrieving said content, said error being determined based on a comparison of said expected content and said returned content;
    wherein said comparison of said expected content and said returned content determines a percentage of matching content between said expected content and said returned content, said error being determined when said percentage of matching content is below a level.

9. The storage medium of claim 1 further comprising instruction is for causing the computer to implement: adding said hyperlink to an error list upon detecting said presence of said error.

10. The storage medium of claim 1 further comprising instructions for causing the computer to implement:
    adding said hyperlink to a confirmed list upon detecting said absence of said error.

11. The storage medium of claim 10 further comprising instructions for causing the computer to implement:
    transmitting said confirmed list to a web site administrator.

12. The storage medium of claim 1 further comprising instructions for causing the computer to implement:
    notifying a web site administrator of said error by transmitting said error list to said web site administrator.

13. The storage medium of claim 1 wherein:
    said hyperlink database includes a link location field containing a storage location for each hyperlink.

14. The storage medium of claim 1 wherein:
    said hyperlink database includes a status field indicating said presence or absence of said error with respect to each hyperlink.

* * * * *